Sept. 20, 1949. G. V. RYLSKY 2,482,440
RADIANT ENERGY RECEIVER
Filed March 13, 1944 2 Sheets-Sheet 1
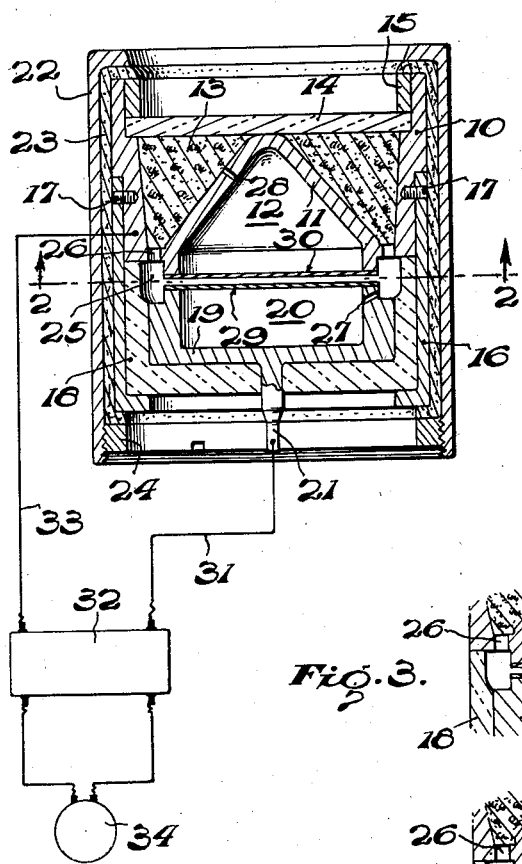
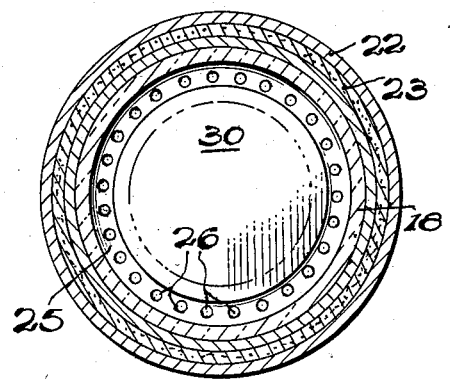
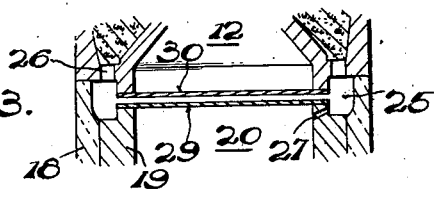
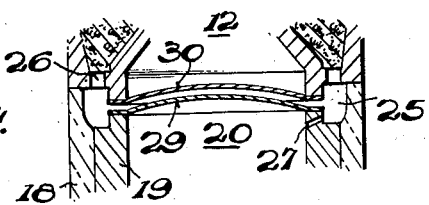
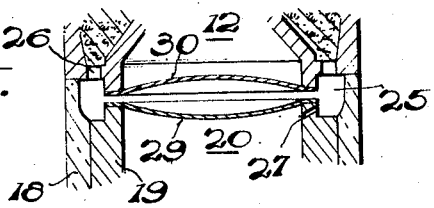
INVENTOR
Gregory V. Rylsky.
BY
ATTORNEY Sept. 20, 1949.                G. V. RYLSKY                2,482,440
                          RADIANT ENERGY RECEIVER Filed March 13, 1944                              2 Sheets-Sheet 2

INVENTOR
Gregory V. Rylsky.
BY
ATTORNEY

Patented Sept. 20, 1949

2,482,440

UNITED STATES PATENT OFFICE 2,482,440

RADIANT ENERGY RECEIVER

Gregory V. Rylsky, Ridgefield Park, N. J., assignor to Bendix Aviation Corporation, Teterboro, N. J., a corporation of Delaware Application March 13, 1944, Serial No. 526,246

12 Claims. (Cl. 250—83.3)

This invention relates generally to radiant energy devices and more particularly to radiant energy receivers.

Prior radiant energy receivers have utilized the principle of a variable condenser whose capacity varies in repsonse to radiant energy to thereby energize an electrical circuit which contains the condenser as a part thereof. The U. S. Patent to Hall No. 2,115,578 issued April 26, 1938 is illustrative of the foregoing type of receiver. The condenser usually comprises a movable diaphragm which constitutes one plate of the condenser and a fixed member constituting the other plate of the condenser. The disadvantage arising with the known receivers is that upon the occurrence of shocks, accelerations or vibrations imposed upon the receiver, the movable diaphragm would respond to such shocks or vibrations and become actuated relative to the fixed plate of the condenser thereby undesirably varying the capacity of the condenser and producing a signal indicating the presence of a source of radiant energy whereas, in fact, no such source has been brought into the field of the receiver.

An object of the present invention, therefore, is to provide a novel radiant energy receiver cell which overcomes the foregoing disadvantages in that its accuracy is unimpaired by the presence of shocks or vibrations imposed upon the cell.

Another object of the invention is to provide a novel radiant energy receiver cell of the condenser type having two pressure responsive members as the plates thereof, the members being so arranged that they are actuated in opposite directions to vary the capacity of the condenser in response to a change in pressure resulting from intercepted radiant energy and both actuated in the same direction in response to shocks, accelerations or vibrations imposed upon the cell so that the capacity of the condenser remains unchanged during the action of extraneous forces whereby the cell is sensitive only to changes in radiant energy.

A further object of the invention is to provide a novel apparatus of the character described which instead of using the condenser principle utilizes pressure responsive generators of electrical potential which are sensitive to radiant energy.

Another object is to provide a novel radiant energy receiver cell which comprises a pair of pressure responsive generators of electrical potential such as plates of Rochelle salts, for example, which may be connected in series or in parallel and which, moreover, are so arranged that they are sensitive only to changes in pressure resulting from changes in radiant energy and remain unaffected during the action of shocks, accelerations or vibrations or other extraneous forces imposed thereon.

A further object of the present invention is to provide a novel radiant energy receiver cell comprising a pair of doublet crystals of the type adapted to generate electrical potentials in response to pressure changes, the crystals being spaced and so arranged that they will be actuated in the same direction in response to extraneous vibrations whereby the electrical impulses produced thereby are nullified and the electrical circuit associated with the cell remains de-energized during the occurrence of such vibrations.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

In the drawings, wherein like reference characters refer to like parts throughout the several views;

Figure 1 is a side elevation view in section of the novel radiant energy receiver cell of the present invention;

Figure 2 is a section view taken substantially along line 2—2 of Figure 1;

Figures 3, 4 and 5 illustrate various operating positions of the novel sensitive elements of the cell of Figure 1;

Figure 6:
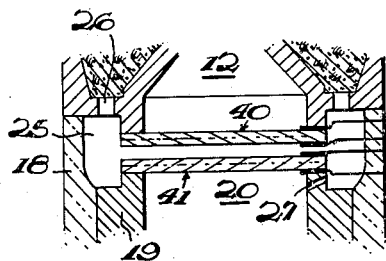
Figures 6, 7 and 8 illustrate various operating positions of the novel sensitive elements of a different form of the invention; and, Figures 9, 10 and 11 illustrate various operative positions of a further form of the invention.

Referring now more particularly to Figure 1 of the drawings, for a more detailed description of the present invention, the receiver cell is shown as comprising a body portion 10 having an inclined wall 11 defining a central chamber 12 and an outer chamber 13, the latter being provided with a finely divided dark substance, such as carbonized vegetable fibres in the form of a fine fluff. Chamber 13 is provided with a window or cover glass 14, preferably formed of rock salt, the cover glass being held in place by means of a retaining ring 15.

A retaining shell 16, fastened at one end to body portion 10 by suitable means such as screws 17, for example, is provided with a flange at its lower end for supporting therein an insulating member 18, which may be formed of glass, for engagement with portion 10. Rigidly supported within insulating member 18 is a cup member 19 forming a chamber 20 therein and having a rod 21 projecting therefrom through member 18.

The assembly thus described is surrounded by a casing 22 having a sealing and insulating member 23 therebetween, the lower end of the casing being threaded for the reception of a retaining ring 24 which maintains the entire assembly in a fixed condition.

The outer edge of insulating member 18 and cup member 19 is milled down to thereby define a space or chamber 25 which is in communication with outer chamber 13 by virtue of a series of openings 26. Moreover, chamber 20 is in restricted communication with space 25 by way of an orifice 27 formed in member 19 while chamber 12 is in restricted communication with chamber 13 by virtue of an orifice 28.

In accordance with the present invention novel means are now provided, which act in the nature of a variable capacity condenser, such means comprising a flexible diaphragm 29 sealably secured to the free end of cup member 19 and a second flexible diaphragm 30 sealably secured to close the open end of chamber 12. Diaphragm 29 constitutes one plate of the condenser and is electrically connected by means of a conductor 31 to the input of a suitable amplifier 32 while diaphragm 30 constitutes the other plate of the condenser and is electrically connected by means of a conductor 33 to the input of the amplifier. Member 18 insulates one side of the circuit from the other and any suitable indicating, recording or controlling device 34 may be associated with the output of the amplifier.

When the above-described cell is exposed to a source of radiant energy, the dark substance within chamber 13 responds to the radiant energy in that its temperature is raised and gasses are released thereby which are communicated by way of openings 26 and space 25 to the space between diaphragms 29 and 30 whereby the latter are caused to flex or expand in opposite directions in the manner shown in Figure 5. As a result of such action the capacitance of the condenser is changed and device 34 responds to such change.

The arrangement of openings 26 is such that it insures the least minimum of resistance to the propagation of pressure waves into the space between the two diaphragms. All of the spaced chambers, i. e., chambers 12, 13, 20, 25 and the space between the diaphragms are filled with air or $CO_2$ or some other suitable gas. Moreover, chambers 12 and 20 are large enough so that they do not produce any appreciable counter-pressure against the flexing diaphragms. Orifices 27 and 28 between chambers 20 and space 25 and between chambers 12 and 13 serve as equalizers of the pressure within all of the chambers of the cell which might otherwise become unbalanced due to changes in ambient temperature.

The present novel arrangement of diaphragms 29 and 30 is such that the disadvantages surrounding known radiant energy receiver cells requiring a stationary and a relatively movable condenser plate has been overcome. Reference is made to Figure 3 which illustrates the position maintained by both diaphragms during a condition of rest and it follows that if such an arrangement is subjected to sudden shock, accelerations or vibrations, both diaphragms, because they are designed to have the same masses and the same elastic characteristics so that they will have the same natural period of oscillations, will be deflected in the same direction in the manner shown in Figure 4 which means that as a result of the shock or vibrations the capacity of the condenser remains unchanged so that device 34 is unaffected by these extraneous forces and thereby responds only to radiant energy falling upon the dark substance within chamber 13.

There is thus provided a novel radiant energy receiver cell in which the sensitive elements or diaphragms are arranged to be deflected in opposite directions in response to radiant energy to thereby vary the capacitance of the condenser formed by the elements or diaphragms and one in which the same elements or diaphragms deflect in the same direction in response to sudden shocks, accelerations or vibrations so that at such time the capacitance of the condenser remains unchanged whereby the cell is sensitive to radiant energy only and free from the effects of extraneous forces other than the radiant energy.

The cell above described and illustrated in Figures 1 to 5, inclusive, utilizes the condenser principle whereby the capacitance of an electrical circuit is varied in proportion to the radiant energy impressed upon the cell. Substantially the same result may be obtained by providing generators of electrical potential which will operate in response to pressure variations caused by radiant energy being impressed upon the dark substance within chamber 13. To this end, therefore, reference is made to Figure 6 to 8, inclusive, wherein is shown a second embodiment of the invention using pairs of plates or crystals 40 and 41 formed of Rochelle salts. These plates are sealably secured to the open ends of chambers 12 and 20 in place of diaphragms 29 and 30, and the remainder of the cell is substantially the same as shown in Figure 1.

The upper end of plate 40 is connected with a suitable outlet conductor 42 while the top of plate 41 is likewise connected with an outlet conductor 43, the two bottom ends of the plates being interconnected by a conductor 44 so that the two plates are series connected and conductors 42 and 43 may be associated with the input of amplifier 32 of Figure 1.

Figure 7:
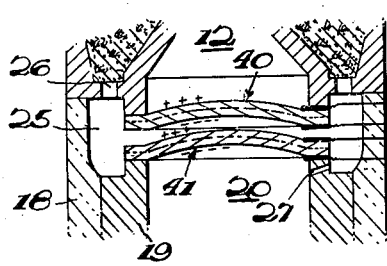
Figure 8:
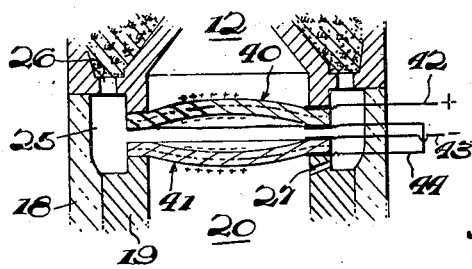

The two plates 40 and 41 are shown in a condition of rest or equilibrium in Figure 6 wherein no charges have been developed by the plates so that no potential difference exists across conductors 42 and 43. As soon, however, as radiant energy is impressed upon the dark substance of chamber 13, varying pressures are developed which communicate with the space between plates 40 and 41 whereby the plates are deflected in opposite directions as illustrated in Figure 8. As a result of such deflection on the part of the plates, a difference in potential is developed across conductors 42 and 43 for the reason that a potential difference is generated across the top and bottom of both plates, the upper side of plate 40 becoming positive with respect to lower side while the lower side of plate 41 becomes positive with respect to its upper side. Thus, by virtue of the connection shown a current flows in conductors 42 and 43. If, however, the cell is subjected to sudden shocks or vibrations, the two plates become deflected in the same direction in the manner shown in Figure 7. In such an event, the top sides of both plates become positive with respect to their respective bottom sides so that the potential developed across both plates is the same and no current flows in conductors 42 and 43.

Plates 40 and 41, therefore, because of the arrangement described, deflect in opposite directions in response to the presence of radiant energy to generate an electrical current proportional thereto while, in response to shocks or vibrations they deflect in the same direction so that the potentials developed by the plates are the same and no current flows as a result thereof.

Figure 9:
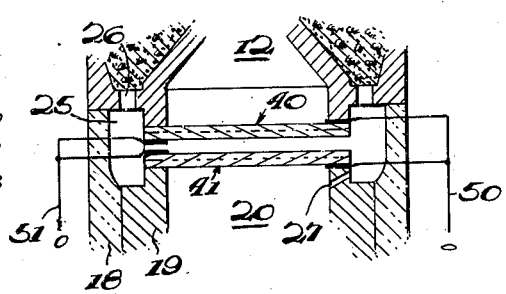
Figure 10:
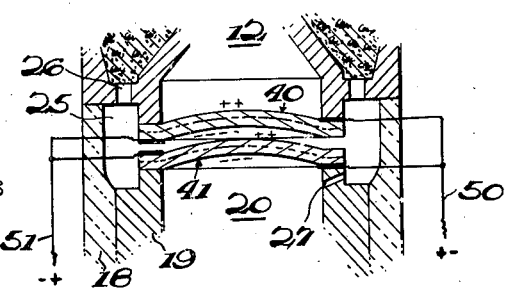
Figure 11:
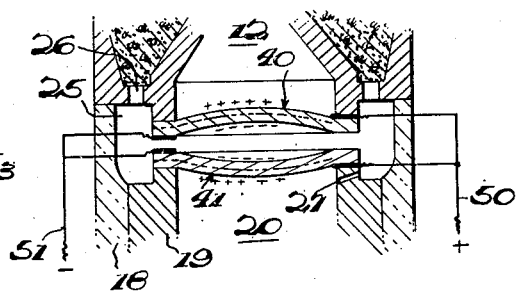

Instead of being connected in a series relation, plates 40 and 41 may be connected in a parallel relation and to this end reference is made to Figure 9 wherein the top of plate 40 and the bottom of plate 41 are connected to a conductor 50 while the bottom of plate 40 and the top of plate 41 are connected to a conductor 51. The operation of this embodiment is substantially the same as that of the embodiment of Figures 6 to 8, inclusive, in that upon a pressure change between plates 40 and 41, due to radiant energy falling upon the dark substance of chamber 13, plates 40 and 41 are deflected in opposite directions, as shown in Figure 11, and the positive charges developed at the top of plate 40 and the bottom of plate 41 are led off by conductor 50 and the negative charges developed at the bottom of plate 40 and the top of plate 41 are led off by conductor 51. In case of shocks or vibrations applied to the cell, the plates are caused to deflect in the same direction, shown in Figure 10, so that the same charges appear across both conductors 50 and 51 and no current flows as a result thereof.

A novel radiant energy receiver cell has thus been provided which responds and is sensitive only to radiant energy and is unaffected by sudden shocks or vibrations impressed upon the cell.

Although several embodiments of the present invention have been illustrated and described in detail, it is to be expressly understood that the invention is not limited thereto. Various changes may be made in the design and arrangement of parts without departing from the spirit and scope of the invention, as will now be understood by those skilled in the art. For a definition of the limits of the invention, reference will be had primarily to the appended claims.

I claim:

1. Radiant energy receiving apparatus comprising a casing, a variable capacity condenser comprising a pair of spaced resilient diaphragms in said casing and defining a variable pressure chamber therebetween, means responsive to radiant energy to effect changes in pressure within said chamber whereby said diaphragms are actuated in opposite directions to vary the capacity of said condenser, said diaphragms being arranged to be actuated in the same direction in response to forces other than that provided by said last-named means whereby the capacity of said condenser remains substantially unchanged, and an electrical circuit incorporating said condenser and operated thereby.

2. Radiant energy receiving apparatus comprising a casing, a variable capacity condenser comprising a pair of spaced pressure responsive members in said casing and defining a variable volume pressure chamber therebetween, means responsive to radiant energy to effect changes in pressure within said chamber whereby said members are actuated in opposite directions to vary the volume of said chamber and thereby the capacity of said condenser, and an electrical circuit containing said members and operated thereby when said members are actuated in said opposite directions, said members being arranged for actuation in the same direction in response to vibrations imposed on said casing whereby the volume of said chamber remains substantially constant and said circuit remains inoperative.

3. Radiant energy receiving apparatus comprising a casing, a variable capacity condenser comprising a first plate in the form of a diaphragm mounted in said casing and a second plate in the form of a second diaphragm mounted in said casing and spaced from said first diaphragm, means in said casing responsive to radiant energy to effect changes in pressure in the space between both of said diaphragms to actuate said diaphragms and thereby vary the capacity of said condenser, and electrical means operated by the change in capacity of said condenser.

4. Radiant energy receiving apparatus comprising a casing, a variable capacity condenser comprising a pair of spaced diaphragms in said casing, a chamber in said casing and communicating with the space between said diaphragms, means in said chamber responsive to radiant energy to effect changes in pressure in the space between both of said diaphragms whereby the capacity of said condenser is varied, and electrical means operated by the change in capacity of said condenser.

5. Radiant energy receiving apparatus comprising a casing, a variable capacity condenser comprising a pair of spaced yieldable members in said casing, a chamber in said casing and communicating with the space between said members, means in said chamber responsive to radiant energy to effect changes in pressure in the space between both of said members whereby the capacity of said condenser is varied, and an electrical circuit incorporating said condenser and operated thereby.

6. Radiant energy receiving apparatus comprising a casing having two closed chambers, a pair of spaced pressure responsive members, one of said members being exposed to one of said chambers and the other being exposed to the other of said chambers, a third chamber in said casing, and an annular member located adjacent one of said closed chambers and having a series of perforations for communicating said third chamber with the space between both of said members, means in said third chamber responsive to radiant energy to effect changes in pressure in the space between both of said members to actuate said members, electrical means operated by the actuation of said members, and means providing restricted communication between said two closed chambers and said third chamber.

7. Radiant energy receiving apparatus comprising a casing having two closed chambers, a variable capacity condenser comprising a pair of spaced diaphragms, one of said diaphragms being exposed to one of said chambers and the other being exposed to the other of said chambers, a third chamber in said casing and communicating with the space between said diaphragms, means in said third chamber responsive to radiant energy to effect changes in pressure in the space between said diaphragms to thereby vary the capacity of said condenser, electrical means incorporating said condenser and operated in accordance with the changes of capacity thereof, and means providing restricted communication between said two closed chambers and said third chamber.

8. Radiant energy receiving apparatus comprising a casing having two closed chambers, a pair of spaced yieldable crystals, one of said crystals being exposed to one of said chambers and the other being exposed to the other of said chambers, a third chamber in said casing, an annular member having a series of perforations for communicating said third chamber with the space between said crystals, means in said third chamber responsive to radiant energy to effect changes in pressure in the space between said crystals to thereby actuate said crystals, electrical means incorporating said crystals and operated by the actuation of said crystals, and means providing restricted communication between said closed chambers and said third chamber.

9. Radiant energy receiving apparatus comprising a casing having two chambers, a pair of spaced pressure responsive members, one of said members closing one of said chambers and the other of said members closing the other of said chambers, a third chamber in said casing surrounding one of said two chambers, an annular perforated member adjacent one of said two chambers communicating said third chamber with the space between both of said members, means in said third chamber responsive to radiant energy to effect changes in pressure in the space between both of said members to actuate said members, electrical means operated by the actuation of said members, and means providing restricted communication between said first two chambers and said third chamber.

10. Radiant energy receiving apparatus comprising a casing, a pair of spaced yieldable plates within said casing and defining a variable pressure chamber therebetween, means responsive to radiant energy to effect changes in pressure within said chamber whereby said plates are actuated in opposite directions to generate a difference of electrical potential therebetween, and an electrical circuit operated by said plates, said plates having their bottom ends electrically connected with each other and the top ends thereof connected with said circuit.

11. Radiant energy receiving apparatus comprising a casing, a pair of spaced yieldable plates within said casing and defining a variable pressure chamber therebetween, means responsive to radiant energy to effect changes in pressure within said chamber whereby said plates are actuated in opposite directions to generate a difference of electrical potential therebetween, and an electrical circuit operated by said plates, said plates being interconnected with said circuit and being electrically connected in parallel with one another.

12. Radiant energy receiving apparatus comprising a casing having two chambers, electrical means comprising a pair of spaced pressure responsive members, one of said members closing one of said chambers and the other of said members closing the other of said chambers, a first annular member surrounding one of said chambers and insulating one of said pressure responsive members from the other, a third chamber in said casing surrounding the other of said two chambers, a second annular member having a series of perforations therein and located adjacent the other of said two chambers for communicating said third chamber with the space between both of said pressure responsive members, means in said third chamber responsive to radiant energy to effect changes in pressure in the space between both of said pressure responsive members for the actuation thereof in opposite directions, electrical means operated by the actuation of said members, and means providing restricted communication between said first two chambers and said third chamber.

GREGORY V. RYLSKY.

REFERENCES CITED

The following references are of record in the file of this patent:

UNITED STATES PATENTS

| Number | Name | Date |
|--------|------|------|
| 1,954,204 | Hayes | Apr. 10, 1934 |
| 2,115,578 | Hall | Apr. 26, 1938 |
| 2,144,519 | Wilson | Jan. 17, 1939 |
| 2,278,936 | Lindsay | Apr. 7, 1942 |
| 2,332,154 | Lindsay | Oct. 19, 1943 |